United States Patent [19]
Chartrain et al.

[11] Patent Number: 5,313,036
[45] Date of Patent: May 17, 1994

[54] APPARATUS FOR THAWING AND REHEATING A DEEP-FROZEN FOOD PREPARATION BY MICROWAVE AND INFRARED RADIATION, AND HEATING PROCESS RELATED THERETO

[75] Inventors: Pierre Chartrain, Soliers Bourguebus; Jean-Louis M. R. Guilgue, Beny sur Mer, both of France

[73] Assignee: Moulinex (Societe Anonyme), Bagnolet, France

[21] Appl. No.: 6,129

[22] Filed: Jan. 19, 1993

[30] Foreign Application Priority Data

Jan. 17, 1992 [FR] France .................. 92 00479

[51] Int. Cl.⁵ .............................. H05B 6/72
[52] U.S. Cl. ...................... 219/685; 219/746
[58] Field of Search .................. 219/10.55 E, 10.55 B, 219/10.55 R, 10.55 F, 10.55 A

[56] References Cited

U.S. PATENT DOCUMENTS

| | | | |
|---|---|---|---|
| 4,354,083 | 10/1982 | Staats | 219/10.55 F |
| 4,427,867 | 1/1984 | Dills | 219/10.55 F |
| 4,458,126 | 7/1984 | Dills et al. | 219/10.55 F |
| 4,480,164 | 10/1984 | Dills | 219/10.55 B |
| 4,771,154 | 9/1988 | Bell et al. | 219/10.55 B |
| 4,775,770 | 10/1988 | Fritz | 219/10.55 F |

Primary Examiner—Philip H. Leung
Attorney, Agent, or Firm—Young & Thompson

[57] ABSTRACT

Apparatus for thawing and reheating a deep-frozen food preparation by microwave and infrared radiation comprises a housing enclosing a heating chamber which is delimited by a tubular wall. The chamber is subjected to microwave radiation from two inlets as well as infrared radiation. The inlets of microwave radiation are arranged in two opposed regions of the tubular wall situated on either side of the central region where the food product is positioned, and the infrared heating elements comprise at least two lamps extending axially of the tubular wall and arranged on either side of the central region in two opposed regions distinct from those of the wave guide openings. A heating process performed using this apparatus involves simultaneously producing continuous microwave radiation by alternately feeding two generators branched in anti-parallel, and continuous infrared radiation, throughout a thawing and reheating cycle.

10 Claims, 3 Drawing Sheets

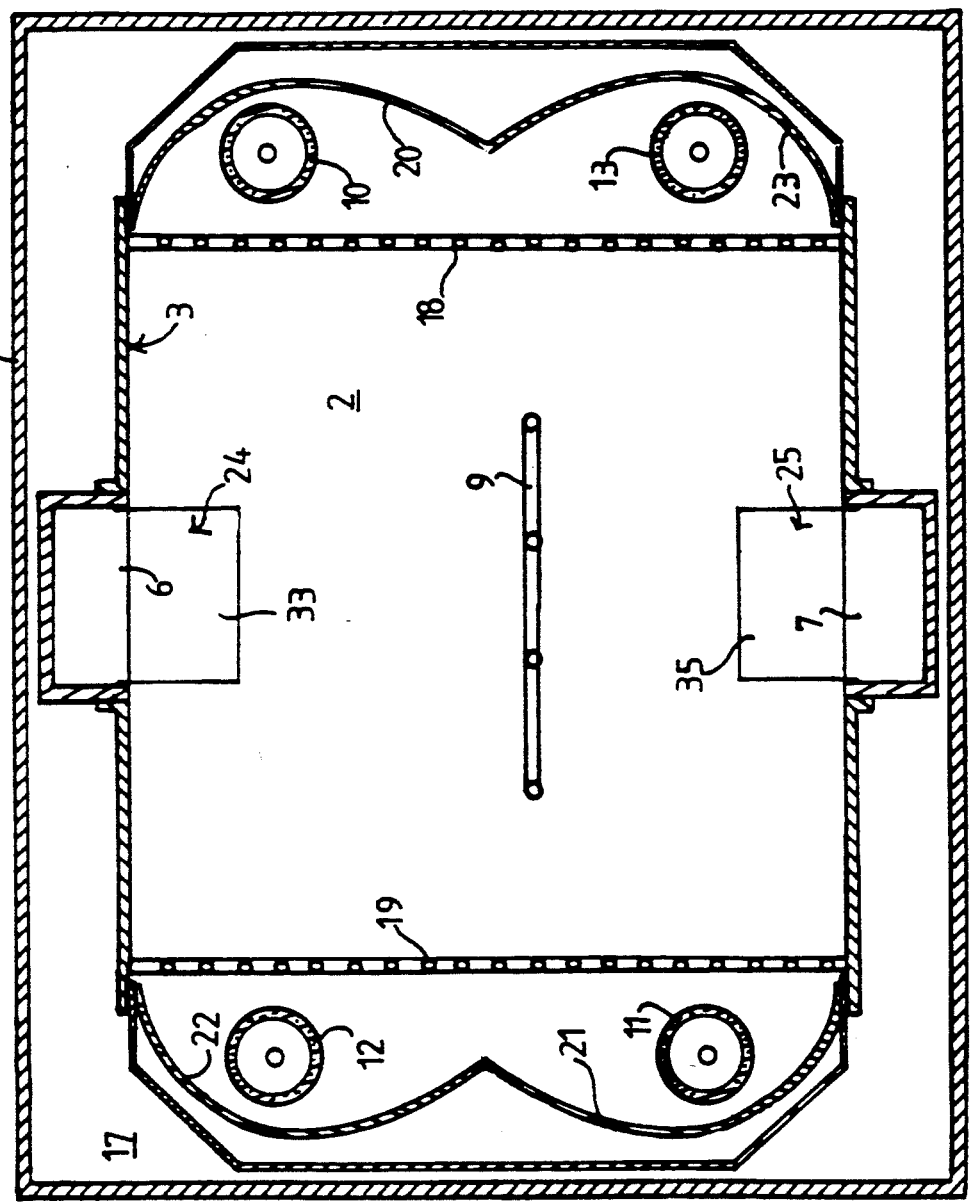

APPARATUS FOR THAWING AND REHEATING A DEEP-FROZEN FOOD PREPARATION BY MICROWAVE AND INFRARED RADIATION, AND HEATING PROCESS RELATED THERETO

The invention relates to an apparatus for thawing and reheating a deep-frozen food preparation by microwave and infrared radiation, comprising a housing enclosing a heating chamber which is delimited by a tubular wall, a base and a movable door, and which is subjected, on the one hand, to microwave radiation exiting from two openings formed in the tubular wall and connected to a pair of wave guides attached to a microwave generator, and, on the other hand, to infrared radiation emitted by heating means, the said chamber being equipped with a support for the deep-frozen preparation.

Already known from U.S. Pat. No. 4,775,770 is the use of at least one generator connected to a pair of wave guides so as to create a cumulative high-frequency field concentrated on the food preparation to be treated. There is also known from European application EP 53.189 a microwave oven comprising infrared heating means. However, whereas each of the embodiments described in these patents permits reducing the heating time for the food preparation, none permits obtaining in a satisfactory manner a thawing and an ultra-rapid reheating, while providing a golden brown grilled appearance.

The object of the present invention is to provide a machine which can be used by people who are generally in a hurry, such as those at airports or train stations, a whose operating cycle for a food preparation is comprised between 30 seconds and 1 minute.

According to the invention, the chamber has a reduced capacity compared to conventional apparatus whose central region receives the support, the openings of the wave guides are distributed over two opposed regions of the said tubular wall situated on either side of the central region, and the infrared heating means comprise at least two lamps extending axially of the tubular wall and arranged on either side of the central region in two opposed regions distinct from those of the wave guide openings.

Thanks to this particular arrangement of the heating elements, it is understood that the two-by-two opposed arrangement of the wave guide openings and the infrared lamps produces a maximum concentration of radiation in the central region of the chamber and thus an ultra-rapid homogenization of the reheating of the preparation, while imparting to certain preparations the golden brown appearance of a quality baked good.

The characteristics and advantages of the invention will appear more clearly from the description which follows, given by way of example and with reference to the accompanying drawings, in which:

FIG. 4 is a transverse section similar to that of FIG. 2 of a variant embodiment of the apparatus according to the invention.

Figure 1:
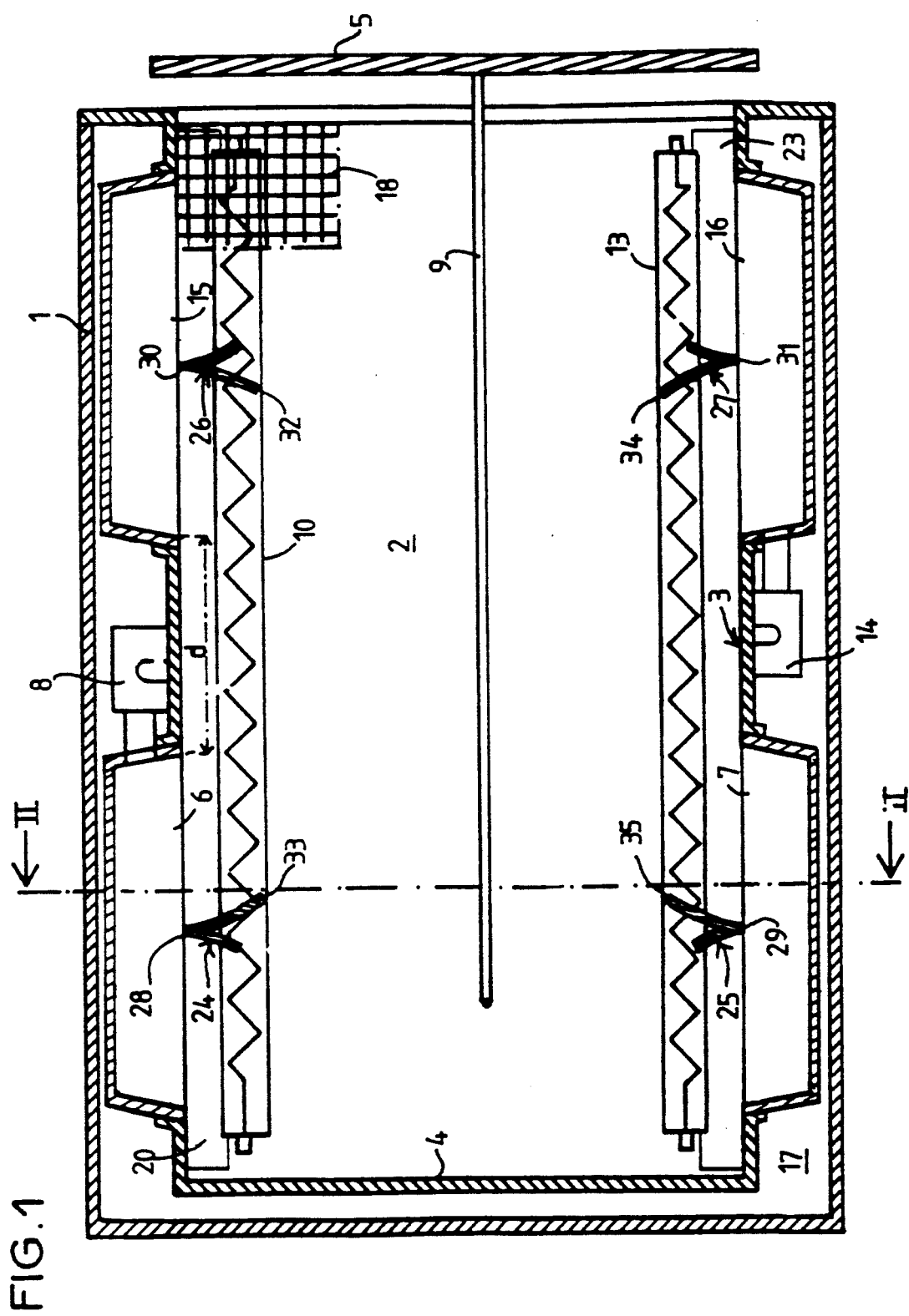
FIG. 1 shows a vertical section of the chamber of the housing of an apparatus according to the invention.

As shown in FIG. 1, an apparatus for thawing and reheating a deep-frozen food preparation comprises a housing 1 enclosing a heating chamber 2 which is delimited by a tubular wall 3, a base 4 and a movable door 5, and which is subjected, on the one hand, to microwave radiation exiting from two openings 6 and 7 formed in the tubular wall and connected to a pair of wave guides attached to a microwave generator shown schematically at 8, and, on the other hand, to infrared radiation emitted by heating means, the said chamber 2 being equipped with a support for the deep-frozen preparation.

Such a pair of wave guides attached to a microwave generator has been described, for example, in U.S. Pat. No. 4,775,770.

In the embodiment described, the microwave radiation is emitted by a magnetron at a wavelength of 2450 Mhz, and the infrared radiation is emitted by quartz-type tubular lamps, preferably by halogen tubes having a wavelength on the order $12 \times 10^5$ Ghz.

According to the invention, the chamber 2 has a reduced capacity compared to conventional apparatus, whose central region receives the support 9, the openings 6 and 7 of the wave guides are distributed over two opposed regions of the said tubular wall 3 situated on either side of the central region, and the infrared heating means comprise at least two lamps 10 and 11 extending axially of the tubular wall and distributed on either side of the central region in two opposed regions distinct from those of the wave guide openings 6 and 7. By way of non-limiting example, the capacity of the chamber is on the order of 5 dm$^3$.

According to another advantageous feature of the invention, the heating means comprise two supplementary infrared lamps 12 and 13 thus forming a set of four infrared lamps disposed axially of the tubular wall and distributed respectively two by two in the upper and lower regions of the chamber 2, whereas the two wave guide openings 6 and 7 are situated in the transverse direction of the wall 3 respectively in the median regions comprised between two consecutive lamps 10–12 or 11–13. Moreover, the housing 1 comprises a supplementary microwave generator shown schematically at 14 and attached to a pair of supplementary wave guides whose openings 15 and 16 formed in the tubular wall 3 are arranged respectively near the other openings 6 and 7 at a distance d such that the radiation of two adjacent openings 6–15 or 7–16 is concentrated over the entire axial extent of the support 9. It will be understood that this distance d is chosen as a function of the axial extent of each of the adjacent openings 6–15 or 7–16.

Figure 3:
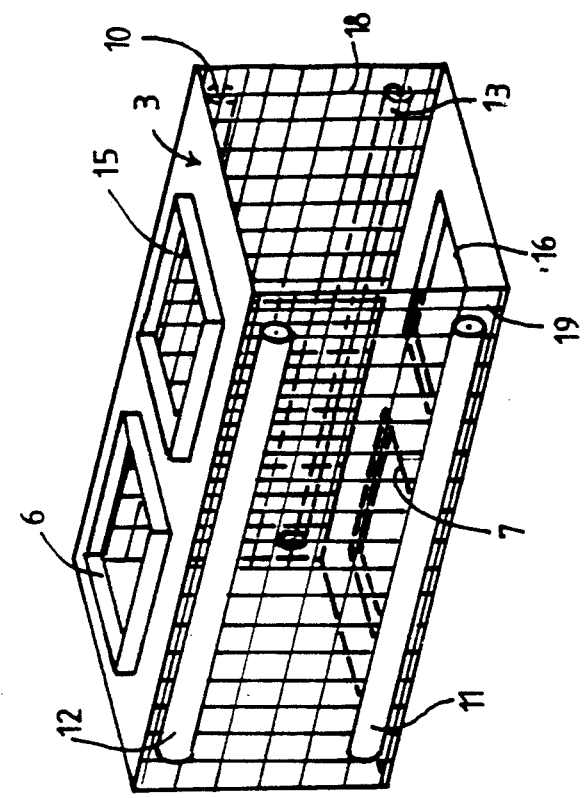
FIG. 3 shows on a smaller scale a perspective view of the tubular wall of the chamber equipped with infrared lamps.
Figure 2:
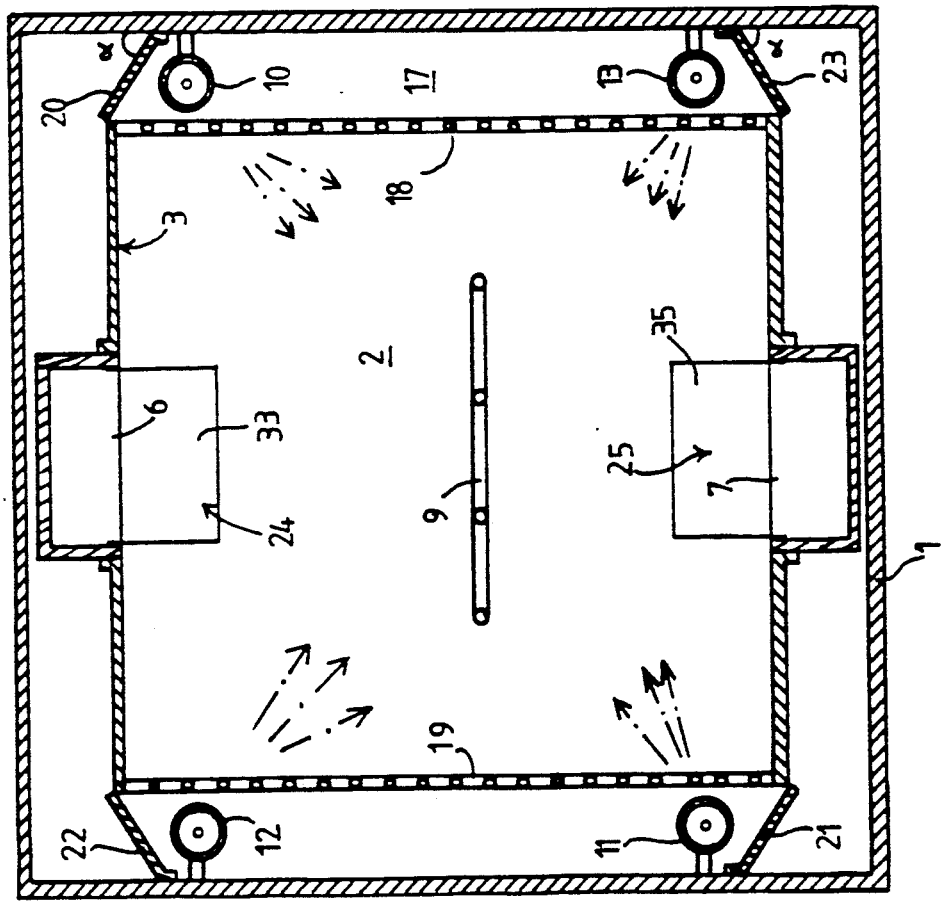
FIG. 2 is a transverse section along the line 11—11 of FIG. 1.

In the particular example illustrated in FIGS. 2 and 3, the housing 1 and the wall 3 of the chamber 2 each have a parallelepipedal shape, and form between them a space 17 in which are disposed the halogen lamps 10 to 13. This space may be traversed by a current of refrigerating air generated by a ventilation device not shown. So as to permit the infrared radiation in the chamber 2, the wall of the chamber situated facing the infrared heating means and also constituting the two lateral sides 18 and 19 of the chamber is a region sealed against microwaves and transparent to infrared radiation. These sides 18 and 19 are each formed by a fine-meshed grating adapted to block microwave radiation.

Moreover, as better shown in FIG. 2, each halogen tube lamp 10 to 13 is equipped with a reflector 20, 21, 22, 23, which extends longitudinally of the lamp and which is arranged between the housing and the external surface of the corresponding side 18 or 19. Each reflector is disposed with respect to the wall of the housing at an angle α chosen such that the reflector reflects the infrared radiation from the tube toward the central region of the chamber and thus onto the deep-frozen food preparation resting on the support 9.

According to a variation illustrated in FIG. 4, and in which elements similar to those of FIG. 2 are given the same reference numerals, the reflectors 20 to 23 have been given an approximately parabolic shape so as, on the one hand, to collect all the radiation behind the halogen tubes, and, on the other hand, to reflect this radiation toward the central region. Thus, the four parabolas permit recovering radiation into the central region of the chamber 2.

According to another characteristic of the invention, each opening 6, 7 or 15, 16 comprises a deflector 24, 25, 26, 27 arranged in a plane transverse to the support 9 so as to promote distribution of the microwave radiation. As shown, each opening having a rectangular shape, the deflector is arranged along the median of the small sides and is constituted by a V-shaped folded metal sheet the summit ridge 28, 29, 30, 31 of which is situated upstream in the wave guide, whereas the two legs of the V extend toward the interior of the chamber 2.

Moreover, tests have shown that in the case where the deep-frozen food preparation has an oblong shape, for example a hot dog, it is necessary in order to obtain a rapid homogenization of the temperature, to promote a concentration of the microwaves in the central portion. Also, the legs 32, 33 and 34, 35 situated opposite one another in the axial direction have a greater length than the other legs, thus creating an asymmetry favoring concentration of the microwaves toward the central region of the chamber.

There will now be described according to a preferred embodiment of the machine with four infrared lamps and two magnetrons, the heating process used to obtain the best results.

After having placed the food preparation in the oven positioned on the support 9, the door 5 is closed and the magnetrons and halogen lamps are activated by means of a control device (not shown). Then, for the duration of a thawing and reheating cycle, there is produced simultaneously a continuous microwave radiation by alternately feeding the two generators 8 and 14 connected for this purpose in an anti-parallel manner, as well as a continuous infrared radiation.

Thanks to this particular combination of the four microwave openings and the four halogen tubes, there is produced, with conventional magnetrons each permitting obtaining a restored power near 850 W and halogen tubes of about 500 W, a restored microwave power of about 1700 W and an infrared power of about 2,000 W. Thus, the concentration of microwave and infrared radiation on the food preparation permits an ultra-rapid thawing and reheating on the order of 30 seconds at a final temperature of about 60° C., while imparting to certain preparations the golden brown appearance of a quality baked good, thanks to the halogen tubes.

In the case wherein the machine is equipped with a single magnetron, it will be understood that the microwave radiation is pulsed and that it is also necessary to use a more powerful magnetron capable of producing in the chamber a restored power of about 1700 W.

What is claimed is:

1. Apparatus for thawing and reheating a deep-frozen food product, comprising a housing (1) enclosing a heating chamber (2) which is delimited by a tubular wall (3), a base (4) and a movable door (5), and which is subjected to microwave radiation exiting from two openings (6 and 7) formed in the tubular wall and connected to a pair of wave guides attached to a microwave generator (8), and to infrared radiation emitted by heating means, the said chamber being equipped with a support (9) for the deep-frozen food product, wherein the central region of the chamber receives the support (9), the openings (6 and 7) of the wave guides are distributed over two opposed regions of the said tubular wall (3) situated on either side of the central region, and the infrared heating means comprise a least two lamps (10 and 11) extending axially of the tubular wall (3) and distributed on either side of the central region in two opposed regions distinct from and disposed between those of the wave guide openings (6 and 7).

2. Apparatus according to claim 1, wherein the heating means comprise two supplementary infrared lamps (12 and 13) thus constituting a set of four infrared lamps disposed axially of the tubular wall (3) and respectively distributed two by two in the upper and lower regions of the chamber (2), whereas the two openings (6 and 7) of the wave guides are situated in the transverse direction of the wall (3) respectively in the median regions comprised between two consecutive lamps (10-12 or 11-13).

3. Apparatus according to claim 2, wherein each lamp (10 to 13) is equipped with a reflector (20 to 23) intended to reflect infrared radiation toward the central region of the chamber.

4. Apparatus according to claim 1, wherein housing (1) comprises a supplementary microwave generator (14) attached to a supplementary pair of wave guides the openings (15 and 16) of which formed in the tubular wall (3) are arranged respectively near the other openings (6 and 7) at a distance (d) such that the radiation from two adjacent openings (6-15 or 7-16) is concentrated over the entire extent of the axial support (9).

5. Apparatus according to claim 4, wherein each opening (6, 7, 15, 16) comprises a deflector (24, 25, 26, 27) arranged in a plane transverse to the support (9) so as to promote distribution of microwave radiation.

6. Apparatus according to claim 5, wherein each opening (6, 7, 15, 16) has a rectangular shape, each deflector (24, 25, 26, 27) is arranged along the median of the small sides and is constituted by a V-shaped folded metal sheet the summit ridge (28, 29, 30, 31) of which is situated upstream in the wave guide, whereas the legs of the V extend toward the interior of the chamber (2).

7. Apparatus according to claim 6, wherein the legs (32, 33 and 34, 35) situated facing one another in the axial direction have a length greater than the other legs.

8. Apparatus according to claim 1, wherein the infrared heating means (12, 11, 12, 13) being disposed respectively in a space (17) arranged between the chamber (2) and the housing (1), the wall of the chamber (3) situated facing the heating means comprises respectively regions (18, 19) sealed against microwaves and transparent to infrared radiation.

9. Apparatus according to claim 8, wherein the regions (18, 19) of the wall sealed against microwaves are each formed by a fine-meshed grating adapted to block microwave radiation.

10. Apparatus according to claim 1, wherein the microwave radiation emitted by a magnetron having a wavelength of 2450 Mhz and the infrared radiation is emitted by quartz-type tubular lamps, and preferably by halogen tubes having a wavelength of about $12 \times 10^5$ Ghz.

* * * * *